United States Patent Office 2,902,446
Patented Sept. 1, 1959

2,902,446

METHODS OF PREPARING ALGINATE SUSPENSIONS

Ernest Knights Mitchell and Richard Henry McDowell, London, England, assignors to Alginate Industries Limited, London, England, a British company No Drawing. Application November 18, 1955
Serial No. 547,851

Claims priority, application Great Britain November 23, 1954

13 Claims. (Cl. 252—3)

This invention comprises improvements in or relating to methods of preparing suspensions of alginates, and in particular to suspensions of sodium alginate in concentrated preparations for the production of foams for fire extinguishing purposes.

It is well known that alginates which are freely soluble in water, are insoluble in moderately concentrated solutions of certain salts which do not react with them to form insoluble alginates. For example sodium chloride is particularly effective in preventing solution of sodium alginate and between 5% and 20% of sodium chloride in water, depending on the type and degree of polymerisation of the sodium alginate, will prevent the sodium alginate from dissolving. The action of the sodium chloride is different from that of a salt such as calcium chloride which reacts to form an insoluble alginate, as with the sodium salt on diluting sufficiently with water, the sodium alginate dissolves. A suspension of a high or medium polymer of sodium or ammonium alginate in sodium chloride solution is much less viscous than a solution in water of the same concentration of the sodium alginate, and such a suspension forms a useful means of rapidly obtaining a dilute solution of sodium alginate by adding the suspension to water. A disadvantage of such suspensions as hitherto prepared is that even when finely ground the alginate gradually settles out and may eventually form a hard mass at the bottom of the mixture and require considerable force to re-suspend it throughout the liquid.

We have now found that by first making a suspension of a soluble alginate in a concentrated salt solution, either by adding it as fine powder or by wet milling a mixture containing the alginate and salt solution, and then mixing this suspension with a solution of alginate in water, the final salt concentration being such that the alginate is substantially insoluble, a mixture having a thixotropic gel structure is obtained. In consequence of this gel structure the suspension is stable but on stirring the mixture becomes fluid and can be poured.

To enable the suspension to form a solution quickly and easily when mixed with water it must be free flowing when agitated, but on the other hand it must have a sufficiently rigid structure when undisturbed to prevent settling. The flow properties of the suspension are controlled by the nature and concentration of the salt used, the type and degree of polymerisation of the alginate and the amounts of the alginate added as solid and solution. In general increasing the salt concentration makes the mix more fluid. Increasing the total alginate concentration or the proportion added in solution form makes the mix thicker.

The effect of these variables can be seen from the following results, obtained using a medium viscosity sodium alginate sold under the name of Manucol SS/LH (the name "Manucol" is a registered trademark) and sodium chloride.

The concentration of sodium chloride must be at least 5% by weight to ensure precipitation of the alginate added as solution. At lower salt concentrations the mixture may slowly form a gel which cannot be readily dispersed in water. Owing to the limited solubility of salt in water it is difficult to get a final concentration of more than about 20% by weight of salt. Within the range 5% to 20% salt, differences of salt concentration will alter the properties of a mixture with the same amount of alginates present. For example, to a mixture containing 4.7 gms. of sodium alginate ground to pass a 150 mesh B.S.S. sieve, 7 gms. of sodium chloride and 75.8 gms. of water was added a solution containing 0.5 gm. of sodium alginate and 12 gms. of water. The resulting 100 gms. of mixture containing 4.7 gms. of powdered sodium alginate, 0.5 gm. precipitated sodium alginate and 7 gms. of sodium chloride was a thixotropic gel which could readily be mixed with 500 gms. of water to give a solution. When the amount of salt was increased to 10 gms. and the amount of water reduced to keep the total at 100 gms. the suspension gradually settled.

On the other hand keeping the total amount of alginate the same but working with between 1.5 and 3 gms. of sodium alginate added in solution form, and powdered sodium alginate to give a total of 5.2 gms. sodium alginate, satisfactory mixtures could be obtained containing either 7% or 10% by weight of salt. If out of 5.2 gms. of total sodium alginate the part added in solution form exceeded 2 gms., and a salt concentration of 5% by weight was used, the mixture became too stiff for easy mixing with water.

If the total amount of sodium alginate present is reduced to less than about 3% by weight settling will take place on standing, even if the salt concentration is as low as 5% by weight. At 7% by weight of salt the minimum sodium alginate concentration for a stable suspension is between 3% and 4% by weight depending on the proportion originally present as solution, and with 10% by weight of salt at least 4% by weight of sodium alginate must be present.

The formation of stable suspensions is not limited to the use of sodium chloride, but the quantities of the other salts required will be different. For example, approximately twice as much potassium chloride as sodium chloride will be required to give similar results. Another salt which can be used is magnesium chloride. Sodium fluoride itself is not sufficiently soluble to give sufficient precipitation of the sodium alginate, but it can replace part of another salt.

One application of soluble alginate suspensions is in fire fighting compounds, particularly in those which are required to produce a stable foam on the surface of an inflammable liquid which is miscible with water. Fire foam compounds containing hydrolysed proteins (usually hydrolysed blood) are extremely satisfactory when diluted with water and mixed with air to produce a foam in extinguishing burning petrol or other liquids which do not mix with water. On the other hand, foam produced in this way is destroyed by contact with alcohol and other inflammable liquids which mix with water, and it is useless in combating fires of such liquids.

It is known that if sodium alginate is dissolved in a diluted solution of this type which is then mixed with air to produce a foam, the alginate if present in sufficient quantity is precipitated in the form of a coherent layer on the surface of the inflammable liquid miscible with water which protects the remainder of the foam from attack by the liquid, and renders it effective in extinguishing fires. Hydrolysed protein (blood) foam compounds as generally prepared contain in the concentrated state sufficient sodium chloride to prevent solution of sodium alginate, and it is therefore possible to utilise the method above described in preparing a stable mixture of sodium alginate in the concentrated foam compound, which on dilution with water prior to foaming gives a solution of sodium alginate suitable for forming a foam which will be stable in liquids miscible with water.

The invention accordingly includes a method of making a stable mixture of a soluble alginate in hydrolysed protein fire foam compounds, consisting in first making an initial suspension of a soluble alginate in a concentrated hydrolysed protein solution, and then mixing this suspension with a solution of alginate in water, the final concentration of salts in the mixture being such that the alginate is substantially insoluble.

The preparation of 1,000 lbs. (approx. 90 gals.) of fire foam compound containing hydrolysed protein (blood) and sodium alginate, and suitable for use on fires of water miscible liquids, is given below by way of example.

*Example I*

475 lbs. of commercial fire foam concentrate (hydrolysed blood) and 75 lbs. of sodium alginate paste of 40% dry matter (i.e. 30 lbs. dry sodium alginate) are mixed in a pebble mill of such a size that it is filled to the brim and no air remains in it, and the mixture is milled for 18 hours. 25 lbs. of 40% dry matter sodium alginate paste, 12 lbs. of sodium metaphosphate, 14 lbs. of sodium sulphite and 2 lbs. of sodium pentachlorphenate are dissolved in 497 lbs. of water. The milled suspension of sodium alginate for the pebble mill is added to this solution gradually with good stirring. A thixotropic mixture is formed from which no settling takes place on long storage but which flows easily after stirring. This mixture when diluted with 16 times its volume of water and beaten up to a foam will flow freely over the surface of a burning liquid miscible with water and form a stable layer which extinguishes the fire. The foam remains stable on the surface of the liquid for several hours. A similar foam of hydrolysed protein without the alginate is destroyed by the water miscible liquid in a few seconds and is ineffective as a fire extinguisher.

*Example II*

475 lbs. of commercial fire foam concentrate (hydrolysed blood) and 75 lbs. of sodium alginate paste of 40% dry matter as before are mixed in a pebble mill and milled for 18 hours. 25 lbs. of sodium alginate paste, 18 lbs. of sodium fluoride and 8 ozs. of hydrazine sulphate together with 2 lbs. of sodium pentachlorphenate are dissolved in 497 lbs. of water. The milled suspension of sodium alginate from the pebble mill is added to the solution gradually and with stirring as in Example I and with similar results. It will be noted that in this case sodium fluoride is substituted for sodium metaphosphate and hydrazine sulphate takes the place of sodium sulphite.

In the above examples the sodium alginate used is a dough of approximately 40% dry matter. Alternatively the alginate can be introduced as a dry powder but it is found easier to introduce a paste without trapping air in the mixture.

The sodium fluoride or in the case of Example I the metaphosphate is included in the mixture to sequester or precipitate calcium when the fire foam compound is diluted with hard water. The presence of free calcium will reduce the solubility of the alginate in water on dilution. A satisfactory mixture can be made up without the added metaphosphate or fluoride but a much larger amount of alginate is required to give a stable foam on hard water.

Formulae for hydrolysed protein foams in some cases include ferrous iron. As ferrous alginate is soluble this does not interfere with the use of the alginate, but if there is any oxidation to the ferric salt there is precipitation of the alginate as the insoluble ferric salt. Hydrazine sulphate (or sodium sulphite if used) is therefore included as an anti-oxidant.

In mixing the original concentrated hydrolysed protein compound with sodium alginate solution there is some reduction in the salt content which renders the mixture more liable to micro-biological attack. The sodium pentachlorphenate is therefore included as a bactericide. The presence of this material is not essential to the carrying out of the invention and other bactericides could be used.

In the case of fire foam compounds which do not contain salt, sodium chloride can be added so that the final mixture contains sufficient salt to prevent solution of the soluble alginate.

We claim:

1. A method of making a stable mixture of a soluble alginate consisting in first making an initial suspension of a soluble alginate in a concentrated solution of a salt which does not react with the alginate to form an insoluble alginate and then mixing this suspension with a solution of alginate in water, the final salt concentration being such that the alginate is substantially insoluble.

2. A method as claimed in claim 1 wherein in making the initial suspension the alginate is mixed with the salt solution as a fine powder.

3. A method as claimed in claim 1 wherein the initial suspension is made by wet milling a mixture of alginate and salt solution.

4. A method as claimed in claim 1 wherein the salt employed is sodium chloride.

5. A method of making a stable mixture of a soluble alginate in hydrolysed protein fire foam compound, consisting in first making an initial suspension of a soluble alginate in a concentrated hydrolysed protein fire foam compound solution containing adequate nonalginate reactive metallic salts to prevent dissolution of the alginate, and then mixing this suspension with a solution of alginate in water, the final concentration of salts in the mixture being such that the alginate is substantially insoluble.

6. A method as claimed in claim 5 wherein the initial suspension is made by wet milling a mixture of alginate and concentrated hydrolysed protein compound.

7. A method as claimed in claim 5 wherein there is included in the mixture an anti-oxidant.

8. A method as claimed in claim 5 wherein there is included in the mixture a salt which will prevent hardness in the water from precipitating soluble alginate.

9. A method as claimed in claim 5 wherein there is included in the mixture a preservative for the protein.

10. A method as claimed in claim 7 wherein the anti-oxidant is hydrazine sulphate.

11. A method as claimed in claim 8 wherein the salt to prevent precipitation of soluble alginate is sodium fluoride.

12. A method as claimed in claim 9 wherein the preservative is sodium pentachlorphenate.

13. A method of making a stable mixture of a soluble alginate consisting in first making an initial suspension of a soluble alginate in a concentrated alkali halide solution and then mixing this suspension with a solution of alginate in water, the final salt concentration being such that the alginate is substantially insoluble.

References Cited in the file of this patent

UNITED STATES PATENTS

| 2,232,053 | Daimler | Feb. 18, 1941 |
| 2,478,988 | Wallerstein | Aug. 16, 1949 |
| 2,837,479 | Birchall | June 3, 1958 |

FOREIGN PATENTS

| 512,042 | Belgium | June 30, 1952 |
| 488,223 | Canada | Nov. 18, 1952 |